(12) United States Patent
Adkisson

(10) Patent No.: US 6,439,600 B1
(45) Date of Patent: Aug. 27, 2002

(54) SELF-CENTERING AIRBAG AND METHOD FOR MANUFACTURING AND TUNING THE SAME

(75) Inventor: Rick Alexander Adkisson, Gold Canyon, AZ (US)

(73) Assignee: Am-Safe, Inc., Mesa, AZ (US)

( * ) Notice: Subject to any disclaimer, the term of this patent is extended or adjusted under 35 U.S.C. 154(b) by 0 days.

(21) Appl. No.: 09/523,874

(22) Filed: Mar. 13, 2000

(51) Int. Cl.$^7$ ................................................ B60R 21/18
(52) U.S. Cl. ..................................... 280/733; 280/743.1
(58) Field of Search ............................. 280/733, 743.1, 280/743.2

(56) References Cited

U.S. PATENT DOCUMENTS

| | | | |
|---|---|---|---|
| 3,905,615 A | * | 9/1975 | Schulman |
| 5,472,231 A | * | 12/1995 | France |
| 5,609,363 A | * | 3/1997 | Finelli |
| 5,868,421 A | * | 2/1999 | Eyrainer |
| 5,984,350 A | * | 11/1999 | Hagan et al. |

* cited by examiner

Primary Examiner—Eric Culbreth
(74) Attorney, Agent, or Firm—Mayer, Brown, Rowe & Maw

(57) ABSTRACT

The disclosed invention relates to self-centering airbags, restraint systems that use them and the methods for manufacturing and tuning them. Sculpturing, which includes forming at least one cutout in the airbag, is used to form an airbag that when deployed, has a centerline that is not necessarily centered about the point at which the airbag is fixed to a structure (the fixation point). The self-centering airbag can be used as part of a restraint system, wherein the self-centering airbag is embedded within a structure such as a safety belt. Because the centerline of the self-centering airbag can be adjusted, the self-centering airbag does not need to be embedded in the safety belt in a location that, when worn by a passenger, is central with respect to the relevant part of the passenger's body. The location of the deployed self-centering airbag's centerline can also be adjusted or tuned by varying the distance between the self-centering airbag centerline and the fixation point, the angle at which the self-centering airbag is attached to a structure, and the method by which the self-centering airbag is folded in preparation for deployment.

12 Claims, 2 Drawing Sheets

SELF-CENTERING AIRBAG AND METHOD FOR MANUFACTURING AND TUNING THE SAME

BACKGROUND OF THE INVENTION

1. Field of the Invention

The present invention relates to a self-centering airbag, and methods for manufacturing and tuning the same. The present invention also relates to restraint systems incorporating self-centering airbags. Particularly, the present invention is directed to airbags that when deployed are centered about a predetermined location.

2. Background of the Invention

Prior passenger safety systems found in vehicles such as automobiles and aircraft have generally been restraint systems of two principal types, seat belts and airbags. Possibly the earliest to be used was the passenger lap belt which was attached to a fixed substructure at each end and was joined over the user's lap by suitable buckle assemblies. Normally, one of the two pieces making up the belt was of fixed length while the length of the other piece could be adjusted in order that the belt could accommodate users of all sizes. This type of belt was used for many years in automobiles and remains to this day the principal type of restrain system used for passenger safety in private and commercial aircraft.

Later, to further protect against possible injury, the lap belts in automobiles were modified to include a shoulder strap that was attached at a third fixed point to restrain the passenger's upper torso against forward movement during a crash event. The latest significant protective equipment added to passenger automobiles were passive restraints or airbags. Airbags, which are inflated by compressed gas, are mounted in the automobile steering column and other fixed locations within the automobile, such as the dash board and side panels. In the event of a sudden deceleration, as in a crash event, sensors identify the event and the compressed gas is released to expand the airbags at high speeds in the direction of the passenger to prevent forward movement of the passenger. Airbags have proven generally effective in providing passenger protection especially when used in conjunction with safety belts.

While airbags are now common as passive restraints for passengers in the front seat of an automobile, their use is not equally widespread in trucks, related commercial vehicles or in the rear seats of automobiles. Further, seat mounted airbags have not been used in aircraft for passenger protection, for reasons having to do primarily with aircraft design and use, seat design and seat location. Seats in commercial aircraft, unlike those in land vehicles, are not fixed in a permanent position. For example, the seats are movable to different locations and are removable. In addition, the backs of aircraft seats are not rigidly mounted but, rather, they swing forward and down in a crash event, so they cannot be used to house airbags.

In order to enable the use of airbags in aircraft by providing a restraint system that is not permanent in nature, later designs have used an airbag/safety belt restraint. U.S. Pat. No. 5,984,350 illustrates such a system where the airbag is embedded within the lap belt. This system uses electronics to sense a crash event wherein an airbag embedded in the lap belt is deployed in a direction away from the passenger wearing the lap belt. The lap belt is comprised of first and second parts that are each fixed at one end to the vehicle sub-structure and are connectable one to the other at the other end over the user's lap. One belt part is preferably of fixed length while the other belt part's length is preferably adjustable so that the combined lengths of the two belt parts can be changed as required. The airbag is preferably embedded within the belt part of fixed length.

However, due to the wide range of potential passenger sizes, it is not possible to ensure that the airbag embedded within the belt part of fixed length will be centered with respect to the forward facing portion of the passenger's body when the lap belt is worn. Since airbags are typically symmetrical in shape, it is difficult to design an airbag that, when deployed, will provide optimal or even adequate protection in a crash event to passengers of all sizes. Additionally, in some applications, an airbag is needed that can be fixed to a structure at a point that is located an offset distance from the airbag's centerline. Therefore, what is needed is a self-centering airbag. A self-centering airbag is an airbag that when deployed, becomes centered about a desired point that is not necessarily the point to which it is fixed.

OBJECTS OF THE INVENTION

It is an object of this invention to provide a combined airbag/safety belt restraint system that will protect vehicle passengers of a wide variety of sizes.

It is a further object of this invention to provide an airbag/safety belt particularly suited for use in aircraft and also for use in land vehicles.

It is a further object of this invention to provide an airbag that is self-centering when deployed.

It is a further object of this invention to provide a method for creating a self-centering airbag.

It is a further object of this invention to provide a method for creating an airbag and an airbag/safety belt restraint system wherein the airbag is self centering when deployed.

It is a further object of this invention to provide a method for tuning the deployment of an airbag.

SUMMARY OF THE INVENTION

The system, apparatus and methods of this invention relate to self-centering airbags, particularly single-chamber airbags. Sculpturing, which includes forming at least one cutout in the airbag, is used to form an airbag that when deployed, has a centerline that is not necessarily centered about the point at which the airbag is fixed to a structure (the fixation point). The self-centering airbag can be used as part of a restraint system, wherein the self-centering airbag is embedded within a structure such as a safety belt. Because the centerline of the self-centering airbag can be adjusted or tuned, the self-centering airbag does not need to be embedded in the safety belt in a location that, when the safety belt is worn by a passenger, is central with respect to the relevant part of the passenger's body. The location of the deployed self-centering airbag's centerline can also be adjusted or tuned by varying the distance between the self-centering airbag centerline and the fixation point, the angle at which the self-centering airbag is attached to a structure, and the method by which the self-centering airbag is folded in preparation for deployment.

While the devices and methods disclosed herein may be, as noted earlier, used in any type of passenger vehicle, it is especially applicable in those situations where two point attachments, such as lap belts, are used as the sole means of protection. These situations include, for example, aircraft and those automotive applications where a rigid structure is generally not available for airbag installation.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the system.

The methods, apparatus and system presented herein may be used for passenger safety systems for vehicles. The present invention is particularly suited for protecting passengers of different sizes and for applications where an self-centering airbag is to be fixed to a structure such that when deployed, it will not be centered about the point to which it was fixed. For purpose of explanation and illustration, and not limitation, an exemplary embodiment of the apparatus is shown in FIG. 1 and an exemplary embodiment of the system in accordance with the invention is shown in FIGS. 2 and 3.

Figure 1:
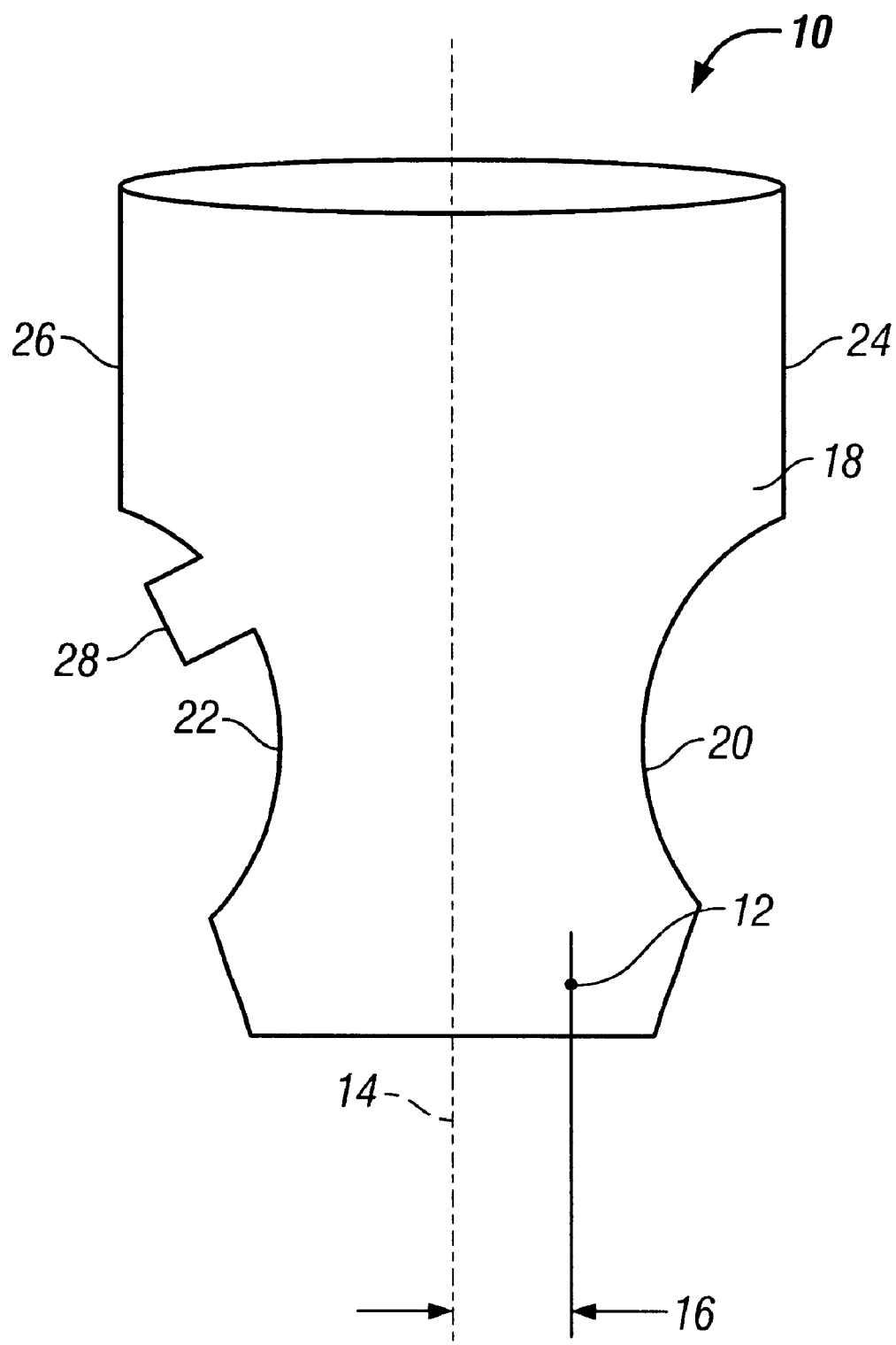
FIG. 1 is a schematic representation of a sample embodiment of the self-centering airbag in accordance with the invention.

FIG. 1 shows a self-centering airbag 10 in its fully deployed state in accordance with the present invention. The airbag 10 can have a single chamber. The self-centering airbag has a shape or footprint 18 which is the shape of the surface of the airbag that is impacted by a vehicle passenger, a self-centering airbag centerline 14 and fixation point 12. The particular footprint 18 shown in FIG. 1 is illustrative only and it should be understood that the footprint can assume a wide variety of shapes. In this embodiment, the self-centering airbag 10 has a first vertical side 24 with a first cutout 20, a second vertical side 26 with a second cutout 22. The self-centering airbag also includes a pressure release valve 28 which is preferably located so that when the self-centering airbag 10 is deployed, the pressure release valve 28 does not contact the passenger. The fixation point 12 is the point where the self-centering airbag is attached to a structure such as seatbelt, seat or other structure. The fixation point is offset a distance, the offset distance 16, from the self-centering airbag centerline 14.

Figure 2:
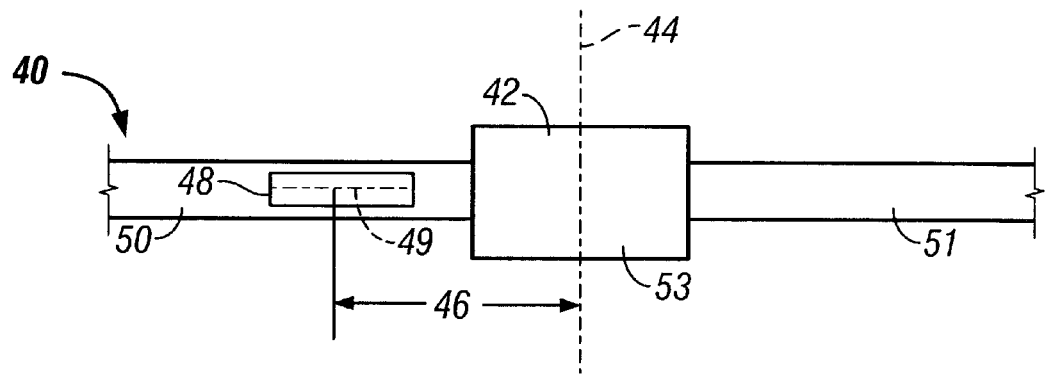
FIG. 2 is a schematic representation of a sample embodiment of the restraint system before the self-centering airbag has been deployed in accordance with the invention.
Figure 3:
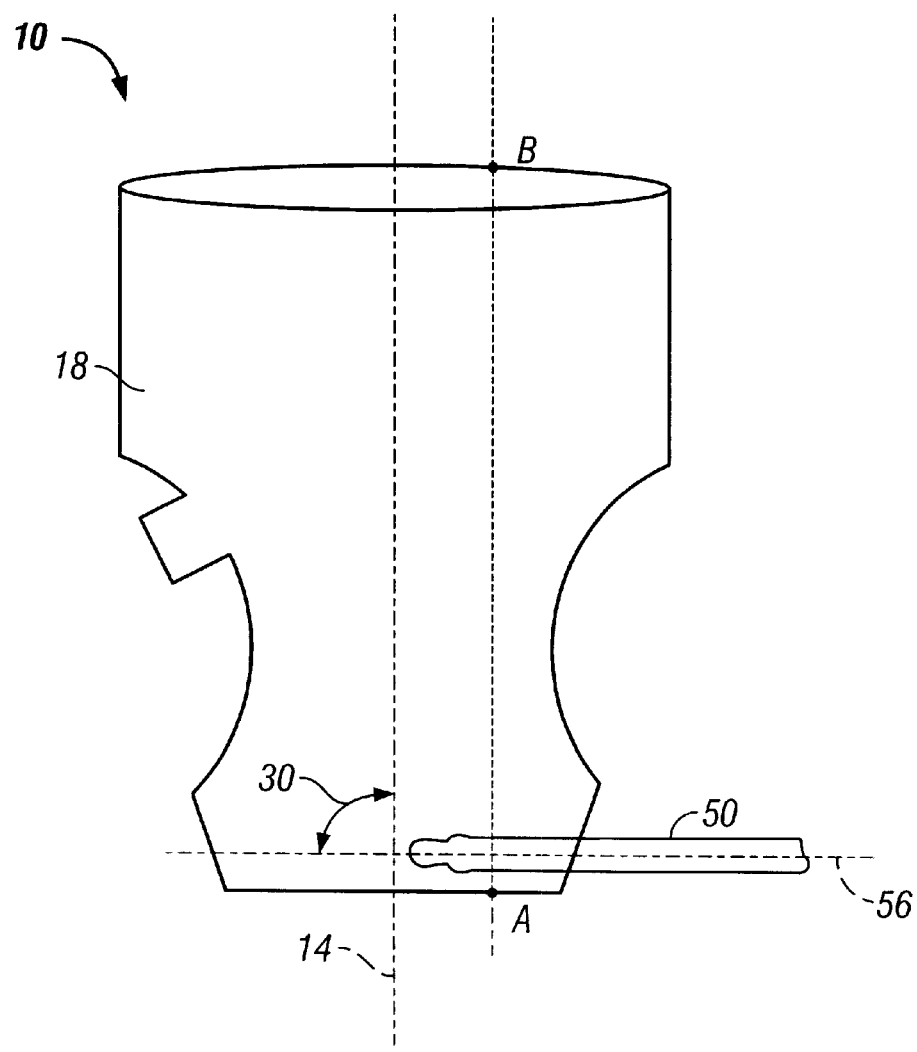
FIG. 3 is a schematic representation of a portion of the restraint system shown in FIG. 2 after the self-centering airbag has been deployed. This view is a 180 degree rotation about the vertical of the view shown in FIG. 2.

As shown in FIGS. 2 and 3, the self-centering airbag 10 can be used as part of a restraint system. In one embodiment, the restraint system 40 generally includes a safety belt 42 and a self-centering airbag 10 embedded within the safety belt 42. FIG. 2 shows the system when the self-centering airbag 10 has not been deployed, while FIG. 3 shows the system rotated 180 degrees about the vertical, after the self-centering airbag 10 has been deployed. The safety belt 42, shown in FIGS. 2 and 3 as a lap belt, is comprised of a fixed length belt 50, an adjustable length belt 51, and a buckle 53 that secures the fixed and adjustable length belts around the passenger's lap. The safety belt 42 also includes a centerline 44 and a horizontal centerline 56. In FIGS. 2 and 3, the self-centering airbag 10 is attached to the fixed length belt 50; however, its location is not so limited. In FIG. 2 the self-centering airbag 10 is embedded in the belt 42 a distance 46 from the centerline 44. The self-centering airbag is fixedly attached to the belt 42 at its fixation point 12, shown in FIG. 1. The self-centering airbag 10 is fixed to the belt 42 so as to create an angle 30 between the self-centering airbag centerline 14 and the horizontal centerline 56 of the belt 42. The footprint 18 of the self-centering airbag 10 is chosen so that when the self-centering airbag 10 is deployed, the self-centering airbag centerline 14 is located so as to provide the passenger with optimal protection in a crash event. As shown in FIG. 2 the self-centering airbag 10 is generally covered by a durable fabric cover 48 that includes a tearseam 49. Upon deployment of the self-centering airbag 10, the pressure of the expanding self-centering airbag causes the durable fabric cover 48 to separate along the tearseam 49, thus allowing the self-centering airbag to deploy into its fully inflated state, as shown in FIG. 3.

In order to ensure that when deployed, the self-centering airbag centerline 14 ends up in the desired location, (this will be referred to as "tuning" the airbag) sculpturing is used to manufacture the self-centering airbag. Sculpturing the self-centering airbag entails creating cutouts such as those shown in FIG. 1 and indicated by numerals 20 and 22. The shape, size, location and number of the cutouts are chosen based, among other factors, on the material used to fabricate the self-centering airbag and the desired location of the self-centering airbag centerline when the self-centering airbag is deployed. In general, when deployed, the self-centering airbag will tend to pull in the direction of a cutout because the gas used to deploy the airbag will generally encounter the cutout before the other surfaces of the airbag providing a force against the cutout. FIG. 1 shows one possible footprint 18 that is the result of sculpturing the self-centering airbag 10.

Along with sculpturing the self-centering airbag, the self-centering airbag may also be tuned by several other methods. These methods can be used alone or in any combination. One method comprises altering the offset distance 16 between the self-centering airbag centerline 14 and the fixation point 12. Another method includes varying the angle 30. The self-centering airbag 10 may also be tuned by varying the way in which the self-centering airbag 10 is folded in preparation for deployment. For example, in FIG. 3 the self-centering airbag is first folded along line A-B so that the first vertical edge 26 is folded into the page. The self-centering airbag 10 is then, starting at a short distance from its top, is folded horizontally. This procedure is repeated until the height of the self-centering airbag is smaller than the width of belt 42 so that the self-centering airbag can be embedded within the belt.

It will be apparent to those of ordinary skill in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A restraint system, comprising:
    a safety belt comprising a vertical centerline; and
    an airbag wherein the airbag self-centers about a predetermined point upon deployment and is embedded within the safety belt a distance from the vertical centerline.

2. A restraint system as claimed in claim 1 wherein the airbag is sculptured.

3. A restraint system as claimed in claim 2 wherein the airbag further comprises:
    a fixation point fixedly attached to the safety belt; and
    an airbag centerline.

4. A restraint system as claimed in claim 3 wherein the fixation point is located an offset distance from the airbag centerline.

5. A restraint system as claimed in claim 4 wherein the airbag includes a footprint, wherein the footprint comprises at least one cutout.

6. A restraint system as claimed in claim 5 wherein the footprint further comprises a first cutout and a second cutout.

7. A restraint system as claimed in claim 6 wherein the footprint further comprises:
   a first vertical edge, wherein the first cutout is in the first vertical edge; and
   a second vertical edge, wherein the second cutout is in the second vertical edge.

8. A restraint system as claimed in claim 7 wherein the footprint is asymmetrical about the airbag centerline.

9. A restraint system as claimed in claim 8 wherein the second cutout is larger than the first cutout.

10. A restraint system as claimed in claim 9 further comprising a pressure release valve.

11. A restraint system comprising:
   a safety belt comprising a vertical centerline and a horizontal centerline; and
   an airbag wherein the airbag self-centers about a predetermined point upon deployment and is embedded within the safety belt a distance from the vertical centerline, comprising:
   an airbag centerline;
   a fixation point located an offset distance from the airbag centerline;
   a first vertical edge;
   a second vertical edge;
   a first cutout in the first vertical edge, wherein the first cutout is arc-shaped;
   a second cutout in the second vertical edge, wherein the second cutout is arc-shaped and is larger than the first cutout; and
   a pressure release valve.

12. A restraint system as claimed in claim 11 further comprising a fabric cover with a tearseam wherein the fabric cover is fixedly attached to the safety belt covering the airbag.

* * * * *